United States Patent
Sengupta et al.

(10) Patent No.: US 9,813,849 B2
(45) Date of Patent: Nov. 7, 2017

(54) SUGGESTIONS BASED ON GROUP CRITERIA

(75) Inventors: Uttam K. Sengupta, Portland, OR (US); Conor P. Cahill, Waterford, VA (US); Mark A. Mccorkle, Oakland, OR (US); Kyle A. Short, Rancho Cordova, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/995,595

(22) PCT Filed: Feb. 9, 2012

(86) PCT No.: PCT/US2012/024532
§ 371 (c)(1),
(2), (4) Date: Sep. 26, 2014

(87) PCT Pub. No.: WO2013/119239
PCT Pub. Date: Aug. 15, 2013

(65) Prior Publication Data
US 2015/0038172 A1 Feb. 5, 2015

(51) Int. Cl.
*H04W 4/02* (2009.01)
*G06Q 30/02* (2012.01)
(Continued)

(52) U.S. Cl.
CPC ............ *H04W 4/02* (2013.01); *G06Q 30/02* (2013.01); *H04L 67/2833* (2013.01);
(Continued)

(58) Field of Classification Search
CPC ......... H04W 4/02; H04W 4/08; H04W 4/008; H04W 4/06; H04W 84/20; H04W 8/005; G06Q 30/02; H04L 67/2833
See application file for complete search history.

(56) References Cited

U.S. PATENT DOCUMENTS 7,516,010 B1 * 4/2009 Kaplan ................. G01C 21/30
340/932.2
8,138,930 B1 3/2012 Heath
(Continued)

FOREIGN PATENT DOCUMENTS

CN 1489044 A 4/2004
WO 2013-147824 A1 10/2013

OTHER PUBLICATIONS

International Preliminary Report on Patentability / with Written Opinion received for PCT Application No. PCT/US2012/024532 mailed on Aug. 21, 2014.
(Continued)

*Primary Examiner* — Brandon Miller
(74) *Attorney, Agent, or Firm* — Grossman, Tucker, Perreault & Pfleger, PLLC (57) ABSTRACT

Systems and methods for generating suggestions based on group criteria. A device may act as a proxy for a group and scan information from other devices in the group. The proxy device may then transmit the scanned information to a remote resource. The remote resource may obtain preference information based on profile information, for devices that are determined to be registered with a service, and based on inquiry responses for unregistered devices. The preference information may be compiled into group criteria that may be employed in making one or more suggestions to the group. If the group selects one of the suggestions then the remote resource may make arrangements based on the selection. Otherwise, additional suggestions may be provided to the group. The remote resource may also monitor the group and continue to make suggestions accordingly.

15 Claims, 7 Drawing Sheets

(51) Int. Cl.
  *H04L 29/08* (2006.01)
  *H04W 4/08* (2009.01)
  *H04W 4/00* (2009.01)
  *H04W 4/06* (2009.01)
  *H04W 8/00* (2009.01)
  *H04W 84/20* (2009.01)

(52) U.S. Cl.
  CPC .............. *H04W 4/008* (2013.01); *H04W 4/06* (2013.01); *H04W 4/08* (2013.01); *H04W 8/005* (2013.01); *H04W 84/20* (2013.01)

(56) References Cited

U.S. PATENT DOCUMENTS

| | | | | |
|---|---|---|---|---|
| 8,463,295 | B1* | 6/2013 | Caralis et al. | 455/456.3 |
| 8,751,427 | B1* | 6/2014 | Mysen | H04L 67/306 |
| | | | | 705/14.58 |
| 9,317,834 | B2* | 4/2016 | Horvitz | G01C 21/3679 |
| 2007/0168219 | A1 | 7/2007 | Kunnes | |
| 2008/0098313 | A1* | 4/2008 | Pollack | 715/753 |
| 2009/0076885 | A1* | 3/2009 | Fein | G06Q 30/0203 |
| | | | | 705/7.32 |
| 2009/0259621 | A1 | 10/2009 | Svendsen et al. | |
| 2010/0076951 | A1 | 3/2010 | Lyle et al. | |
| 2010/0318491 | A1* | 12/2010 | Anderson et al. | 706/52 |
| 2010/0331016 | A1 | 12/2010 | Dutton et al. | |
| 2011/0035388 | A1 | 2/2011 | Im et al. | |
| 2011/0145040 | A1 | 6/2011 | Zahn et al. | |
| 2011/0289015 | A1* | 11/2011 | Mei | G06Q 10/04 |
| | | | | 705/347 |
| 2011/0307558 | A1 | 12/2011 | Romano et al. | |
| 2012/0246684 | A1* | 9/2012 | Yarvis | G06Q 30/02 |
| | | | | 725/60 |
| 2014/0257877 | A1* | 9/2014 | L'Heureux | G06Q 30/06 |
| | | | | 705/5 |

OTHER PUBLICATIONS

International Search Report and Written Opinion received for PCT application No. No. PCT/US2012/024532, mailed on Oct. 23, 2012, 9 pages.
Extended European Search Report from related application EP12868038.6 dated Jul. 10, 2015.
McCarthy, "A Pocket Restaurant Finder: A Situated Recommender System for Groups", Accenture Technology Labs, Jan. 1, 2002.
European Office Action from related application EP12868038.6 dated Mar. 4, 2016.
International Preliminary Report on Patentablity and Written Opinion issued in PCT Application No. PCT/US2012/031331, dated Oct. 1, 2014, 5 pages.
International Search Report issued in PCT Application No. PCT/US2012/031331, dated Nov. 23, 2012, 3 pages.
Chinese Office Action issued in Chinese Application No. 201280069432.7, dated May 3, 2017, with English machine translation, 13 pages.

* cited by examiner

SUGGESTIONS BASED ON GROUP CRITERIA

FIELD

The following disclosure relates to information systems, and more particularly, to systems configured to generate suggestions based on group criteria.

BACKGROUND

Technological advancements in the wireless communication of data have allowed mobile devices to evolve into powerful information tools. For example, mobile devices may be able to provide functionality in support of communications (e.g., email, messaging, etc.), productivity (scheduling, planning, etc.), entertainment (e.g., gaming, social networking, etc.) navigation, etc. through access to various applications, services and websites. At least one information-related function may help to locate particular establishments (e.g., bars, restaurants, etc.) based on user-configured criteria. For example, a user may enter a type of establishment, location, etc., into an application/service/website, which may then display candidates matching the user's criteria, and information about the candidates, in an order based on a sort criterion that may also be user-selected (e.g., availability, distance, rating, etc.). The information presented may help the user to choose a particular establishment to visit. While meant to be beneficial, the ever-expanding number of applications, services and websites, all of which provide different information regarding candidates (e.g., availability, reviews, blogs, special offers, etc.) may prove daunting to a user. The process may be made further problematic when trying to select an establishment based on the preferences of a group of people. Criteria for the entire group must be considered, which may introduce new and possibly variable factors (e.g., dietary restrictions, facilities accommodating groups, group discounts, etc.) that were not relevant when only one user's preferences were being considered.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure describes systems and methods for generating suggestions based on group criteria. As referenced herein, a group may include of plurality of people (e.g., group members). Each group member may have a device capable of wireless communication. At times the group may operate as a unit in that all of the group members may want to participate in an activity such as sharing a meal, attending an event, shopping together, etc. To facilitate activity selection, the group may access a service that can make suggestions based on criteria associated with the entire group (e.g., taking into account preferences of members of the group). In one embodiment one group member's device may act as a proxy device for the entire group. The proxy device may be registered with a service that will provide suggestions to the group. Registration may occur upon device activation, at the time when the group selection functionality will be used (e.g., when a group selection application is activated on the device), etc. Registration may include verifying the existence of a profile, accessible by the service, which is associated with the device and/or user. The profile may comprise at least preference information usable in determining group criteria for generating suggestions, and may exist in a proprietary service database, or may be part of an existing database (e.g., such as associated with an email service, social networking service, etc.).

The proxy device may proceed to scan for other devices (e.g., group member devices). Scanning may occur via close-proximity wireless communication (e.g., Radio Frequency (RF) communication such as defined in the Near Field Communication (NFC) standard, etc.) or short-range wireless communication (e.g., Bluetooth, Wireless Local Area Networking (WLAN), etc.). Other devices that are scanned may respond to the proxy device with device information that at least identifies the scanned device. Upon scanning the group devices, the proxy device may transmit at least the device information to a remote resource (e.g., at least one server that is associated with the service and may be accessible via the Internet). In one embodiment the proxy device may also transmit request information (e.g., characterizing the desired activity such as "lunch," "dinner," "live music," etc.) and/or location information to the remote resource.

The remote resource may determine, based on the device information provided by the proxy device, whether the other devices and/or group members are registered with the service. If the remote resource determines that scanned other devices are already registered, the service may access a profile associated with each registered device in order to obtain preference information. Preference information may include, but is not limited to, restriction information (e.g., in the case of dining dietary restrictions, allergies, etc.), favorites (e.g., in the case of dining favorite types of cuisine, favorite restaurants, etc.), previously visited establishments, links to reviews, organizational memberships (e.g., discount programs, professional organizations, auto clubs, etc.), wish lists, etc. Alternatively, if it is determined based on the device information that scanned other devices are not already registered with the service, inquiry messages may be transmitted to the unregistered devices. To insure security the inquiry message may confirm the other device's membership in the group (e.g., to prevent "spoof" attacks), request preference information for the user of the device, if the user desires to register with the service, etc. The preference information obtained from profiles and the preference information obtained from inquiries may then be used to determine group criteria. Group criteria may include compiled preferences for all of the group members. The remote resource may utilize the group criteria, in conjunction with information available from other sources (e.g., available on the Internet) to generate one or more selections. Information available from other sources may include, but is not limited to, availability information, ratings/reviews/blogs posted by group members, ratings/reviews/blogs posted by others, special offer information (e.g., deals, coupons, etc.). The remote resource may then transmit the one or more selections to the proxy device (and possibly to the other devices). The group may either select a suggestion or reject all of the suggestions. If a suggestion is selected the service may make arrangements (e.g., a reservation) for the group at the selected establishment. If all of the suggestions are rejected, the remote resource may make additional suggestions, possible in conjunction with prompting the group for additional input. In one embodiment the remote resource may continue to provide suggestions to the group regarding other possible activities. For example, if a breakfast establishment is suggested by the service at breakfast time, the service may proceed to provide lunch suggestions just prior to lunchtime, may suggest shopping or entertainment venues that may be enjoyed by the group during the day, etc.

Figure 1:
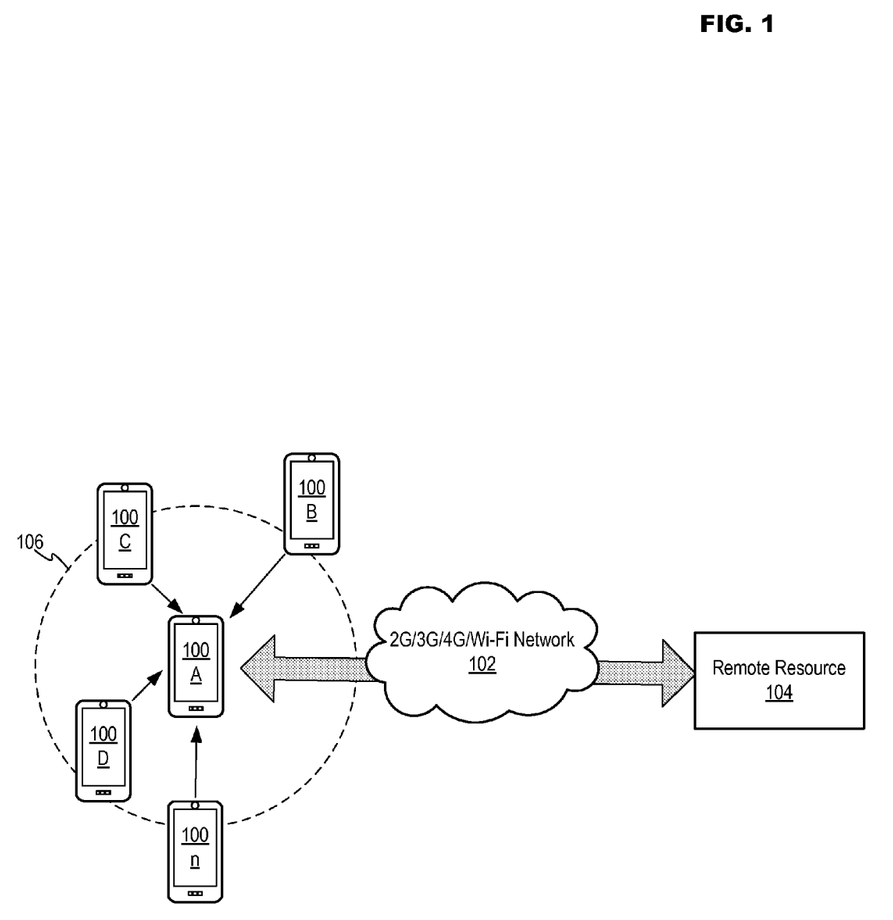
FIG. 1 illustrates an example system configured for generating suggestions based on group criteria in accordance with various embodiments of the present disclosure.

FIG. 1 illustrates an example system configured for making suggestions based on group criteria in accordance with various embodiments of the present disclosure. Devices 100A, 100B, 100C, 100D and 100n (collectively Devices 100A-n) may be devices capable of communicating wirelessly. Examples of devices 100A-n may include, but are not limited to, cellular handsets, smartphones, palmtop computers, tablet computers, ultrabooks, netbooks, notebook computers, laptop computers, etc. Devices 100A-n may communicate via close-proximity, short-range or long range wireless communication. Close-proximity wireless communication typically has an operational range of a few inches/centimeters and includes technologies like infrared (IR), Radio Frequency (RF), Optical readers configured for scanning bar codes, QR codes, etc. One example of an RF communication is standard Near Field Communications (NFC). NFC may utilize RF communication for a variety of information transactions as defined in various specifications set forth by the NFC Forum. Short-Range communications typically have an operational range of a few yards/meters, and include technologies such as Bluetooth, Wireless Local Area Networking (WLAN) as defined in IEEE 802.11, Ultra-Wideband (UWB), etc. Wireless Fidelity (Wi-Fi) is based on WLAN technology and in some instances indicates that certain WLAN devices have been certified for a minimum level of interoperability based on standards set forth by the Wi-Fi Alliance. Long-range communications may have an operational range of many miles/kilometers and may include cellular technologies such as Code Division Multiple Access (CDMA) and the Global System for Mobile Communications (GSM), satellite communication systems, etc. Long-range technologies are also classified by generation. Classifications such as second generation (2G), third generation (3G) and fourth generation (4G) characterize the evolution of wireless communications based on performance measures such as data transfer speed, reliability, etc.

In the example illustrated in FIG. 1, Devices 100A-n may constitute a group based on the intention of the device users to operate together as a group (e.g., to partake in the same activities, etc.). Device 100A may serve as proxy for the group in that it may scan for other group devices (e.g., Devices 100B-n) as shown at 106, and may interact with remote resource 104 via network 102. Scanning 106 may include transmitting a wireless signal via close-proximity or short-range wireless communication as previously described, the wireless signal inviting other group devices to respond. For example, other group devices may respond with device information that at least identifies the responding group device. Network 102 may allow device 100A to communicate with remote resource 104 via any of the long-range wireless technologies described above. In addition, device 100A may also interact with another device (e.g., an access point (AP)) via any of the short-range communications described above. The AP may then provide access to the Internet and remote resource 104. Remote resource 104 may be at least one server coupled to the Internet. A service for providing suggestions based on group criteria may reside on server 104.

Figure 2:
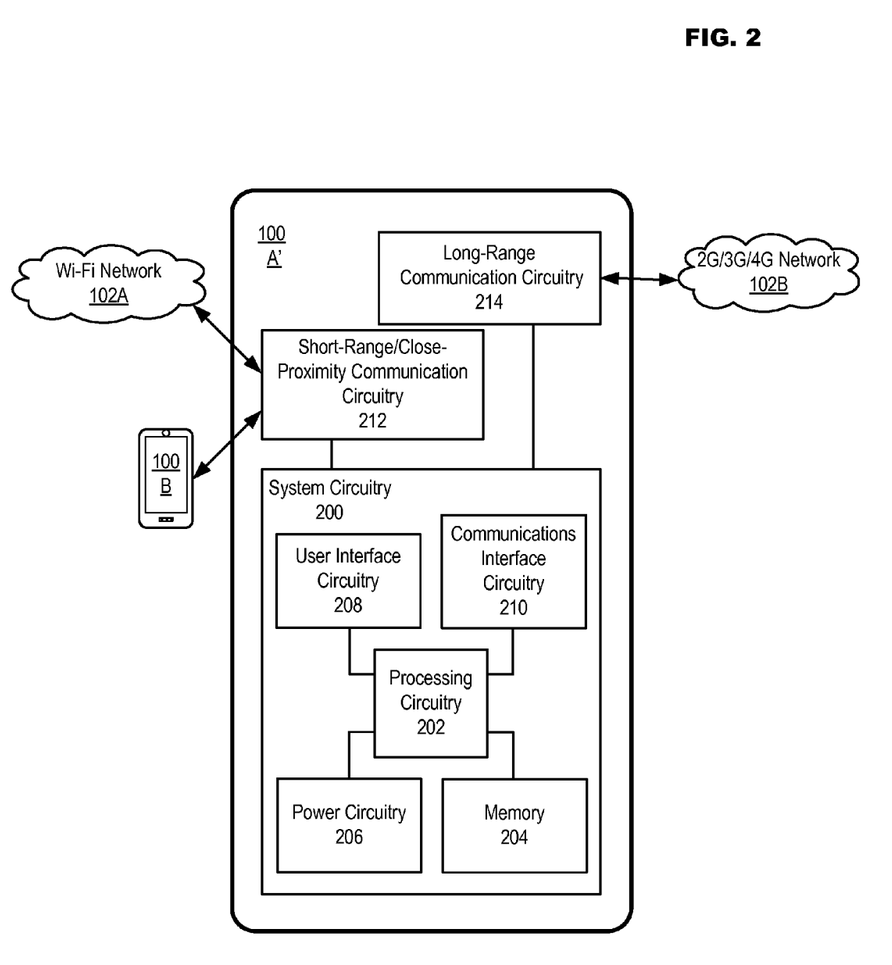
FIG. 2 illustrates an example device in accordance with various embodiments of the present disclosure.

FIG. 2 illustrates an example device 100A' in accordance with various embodiments of the present disclosure. Device 100A' may comprise system circuitry 200 configured to perform the various functions that may occur during normal operation. For example, processing circuitry 202 may comprise one or more processors situated in separate components, or alternatively, one or more processing cores situated in a single component (e.g., in a System-on-a-Chip (SOC) configuration), processing circuitry 202 being configured to execute instructions in device 100A'. Examples of processors may include various X86-based microprocessors available from the Intel corporation including those in the Pentium, Xeon, Itanium, Celeron, Atom, Core i-series product families. Instructions may include program code configured to cause processing circuitry 202 to perform activities related to reading data, writing data, processing data, formulating data, converting data, transforming data, etc. Instructions, data, etc. may be stored in memory 204. Memory 204 may comprise random access memory (RAM) or read-only memory (ROM) in a fixed or removable format. Fixed RAM may include memory configured to hold information during the operation of device 100A' such as, for example, static RAM (SRAM) or Dynamic RAM (DRAM). Fixed ROM may include memories such as bios memory configured to provide instructions when device 100A' activates, programmable memories such as electronic programmable ROMs, (EPROMS), Flash, etc. Other fixed and/or removable memory may include magnetic memories such as floppy disks, hard drives, etc., electronic memories such as solid state flash memory (e.g., eMMC, etc.), removable memory cards or sticks (e.g., uSD, USB, etc.), optical memories such as compact disc-based ROM (CD-ROM), etc. Power Circuitry 206 may include internal (e.g., battery) and external (e.g., wall plug) power sources and any related circuitry needed to supply device 100A' with the power needed to operate. User interface circuitry 208 may include input mechanisms (e.g., microphones, switches, keyboards, speakers, touch screens, various types of sensors capable of sensing proximity/motion/gestures, cameras, etc.) and output mechanisms (e.g., speakers, displays, indicators, electromechanical components for vibration, motion, etc.) and any related circuitry allowing users to interact with device 100A'.

Communications interface circuitry 210 may perform information routing and various control functions for short-range/close-proximity communication circuitry 212 and long-range communication circuitry 214. For example, communications interface circuitry 210 may include control features that help to prevent communication circuitry 212 and 214 from interfering with each other. In performing this function communications interface circuitry 210 may be able to schedule the communications of communication circuitry 212 and 214 based on, for example, the priority of pending communications. Short-range/close-proximity communication circuitry 212 may support short-range wireless communication (e.g., such as with Wi-Fi network 102A) or may support close-proximity wireless communication (e.g., such as with device 100B). While not shown in FIG. 2, it is also possible for short-range/close-proximity communication circuitry 212 to interact with device 100B via short-range wireless communication (e.g., via Bluetooth). Long-range wireless communication circuitry 214 may be configured to communicate (e.g., with remote resource 104) utilizing long range networks 102B such as previously described above.

Figure 3:
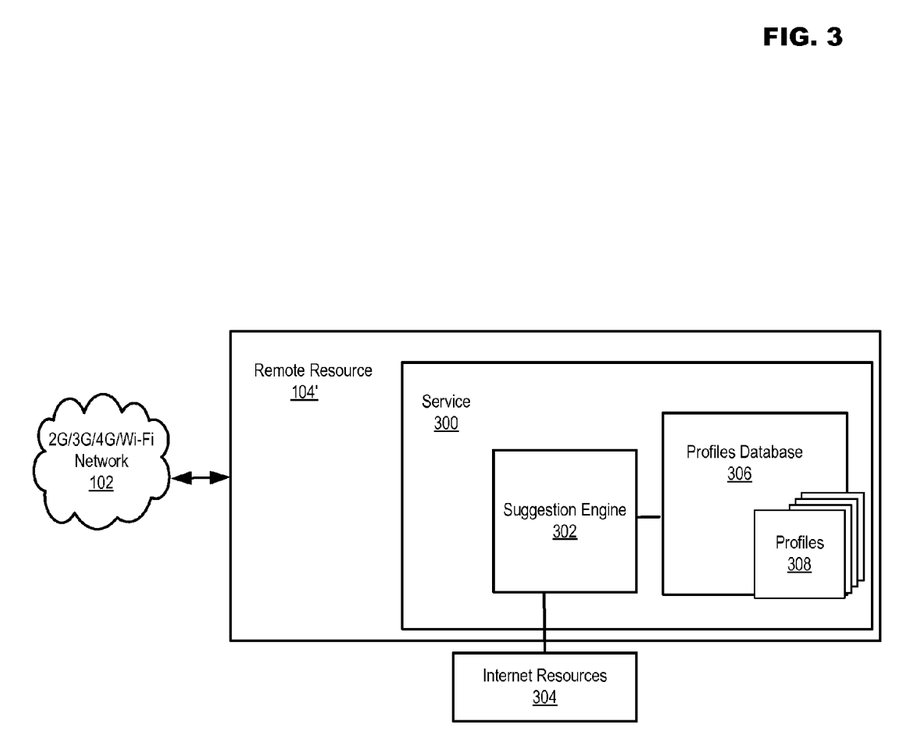
FIG. 3 illustrates an example remote resource in accordance with at least one embodiment of the present disclosure.

FIG. 3 illustrates an example remote resource 104' in accordance with at least one embodiment of the present disclosure. Remote resource 104' may comprise at least one server that is configured to interact with other devices, resources (e.g., the Internet), etc. via network 102. Service 300 may reside in remote resource 104' and may be a proprietary or integrated within another platform. As referenced herein, a proprietary service may be a stand-alone platform that, for example, provides its service for a fee based on membership, based on a per-use fee, for free (e.g., ad-supported), etc. An example of an integrated platform would be a service offered as an additional feature of an existing platform such as, for example, Facebook, LinkedIn, Google+, MSN, etc. Service 300 may comprise at least suggestion engine 302 and profiles database 306. Suggestion engine 302 may perform functions such as, but not limited to, receiving device information from a proxy device, determining whether devices are registered with the service based on the device information, obtaining preference information, determining group criteria and determining suggestions based on the group criteria. In performing these functions, suggestion engine 302 may access profiles database 306 in order to locate profiles 308 corresponding to group members/devices. Profiles database 306 may reside in service 300 (e.g., if service 300 is proprietary) or may be accessible to suggestion engine 302 if service 300 is integrated with another platform (e.g., profiles database 306 may exist in another platform, such as in association with a Facebook or LinkedIn account). Profiles 308 may contain preference information that may be usable by suggestion engine 302 for determining selection criteria for the group. Suggestion engine 302 may utilize the group selection criteria, along with internet resources 304, when generating suggestions. Internet resources 304 may include various websites containing information such as, but not limited to, availability information (e.g., current venue capacity, open tables, etc.), user rating/review/blog information, rating/review/blog information from others, and special offer information (e.g., deals, coupons, etc.).

Figure 4:
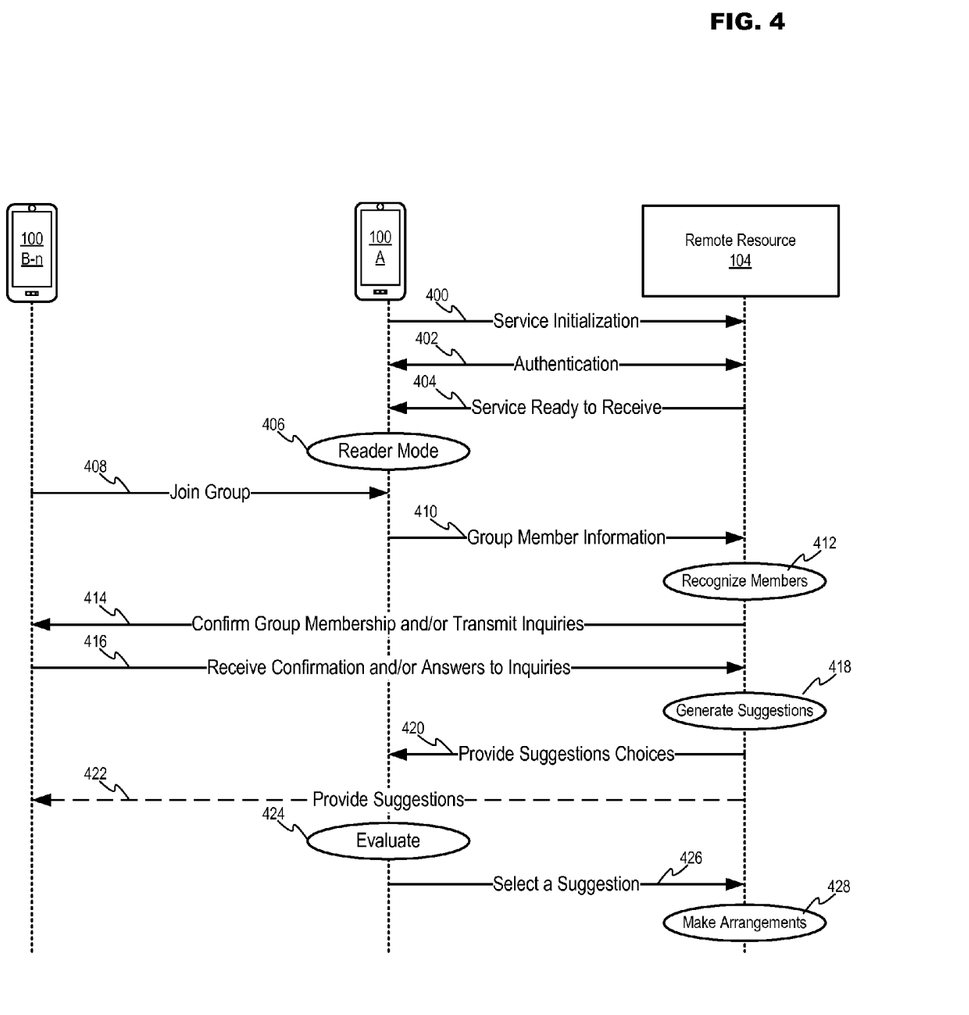
FIG. 4 illustrates an example interaction between a proxy device, other devices and a remote resource in accordance with at least one embodiment of the present disclosure.

FIG. 4 illustrates an example interaction between proxy device 100A, other devices 100B-n and remote resource 104 in accordance with at least one embodiment of the present disclosure. Proxy device 100A may initialize the service with remote resource 104 at 400. In one embodiment the service may initialize whenever proxy device 100A is activated. It is also possible to initialize the service on a per-use basis (e.g., whenever a service-related application is activated on proxy device 100A). The service may then authenticate proxy device 100A at 402. Authentication may comprise the service verifying that proxy device 100A is registered with the service based on identification information provided to the service by proxy device 100A. Authentication may help to provide security by preventing devices from "spoofing" the service (e.g., masquerading as another user/device) and thereby gaining access to someone else's profile information or other aspects of the service. If authentication is successful, remote resource 104 may transmit a service ready to receive signal to proxy device 100A at 404. Proxy device 100 A may then enter a reader mode wherein it may start to scan for other devices. Users that desire to join the group may then place their devices (e.g., other devices 100B-n) within scanning range of proxy device 100A. Other devices 100B-n may then respond to the scanning signal by providing device information that at least identifies the scanned device to proxy device 100A at 408. In one embodiment the device information may also include location information. The location information may be used to verify that the other devices 100B-n are actually within proximity to proxy device 100A, which may serve as another security measure against spoofing attacks.

Upon scanning all of other devices 100B-n, proxy device 100A may transmit at least the group member information to remote resource 104 at 410. In one embodiment proxy device 100A may also transmit request and position information to remote resource 104. Request information may provide a general category for the desired group activity (e.g., breakfast, lunch, dinner, movie, play, live music, etc.) and location information may provide the area in which the activity should be located. Remote resource 104 may then proceed to recognize members at 412. Recognizing members may include determining whether other devices 100B-n are registered with the service based on the device information (e.g., identification information). Messages confirming group membership and/or transmitting inquiries may then be sent to other devices 100B-n at 414. In one embodiment messages may be transmitted to all devices to confirm group membership as a precautionary/security measure. Alternatively, messages may be transmitted only to devices determined not to be registered with the service. In the latter instance the messages may invite the users of other devices 100B-n to join the service and/or request preference information from the users of these devices. Messages confirming group membership and/or providing answers to any inquiries that were transmitted at 414 may be transmitted to remote resource at 416. Remote resource 104 may then generate suggestions at 418. Suggestion generation may include compiling the preference information based on profiles/response messages into group selection criteria, and then using the group suggestion criteria along with other available information (e.g., from the Internet) to generate the suggestions. Remote resource 104 may then provide one or more suggestions to proxy device 100A at 420 (and possibly also to other devices 100B-n at 422. The group may then evaluate the suggestions at 424 and may select a suggestion. Proxy device 100A may then transmit the selected suggestion back to remote resource 104 at 426, and remote resource 104 may make arrangements (e.g., reservations) based on the selection at 428. While not pictured, other processes are also possible. For example, the group may not like any of the suggestions at 424, and instead of selecting a suggestion may request new suggestions, possibly with also providing additional criteria (e.g., the group desires "pizza" instead of "Chinese food"). Remote resource 104 may then make new suggestions. It is also possible for remote resource 104 to continue to provide new suggestions based on monitoring the status of the group (e.g., current position of the group, time of day, activities becoming available/being discounted, etc.).

Figure 5:
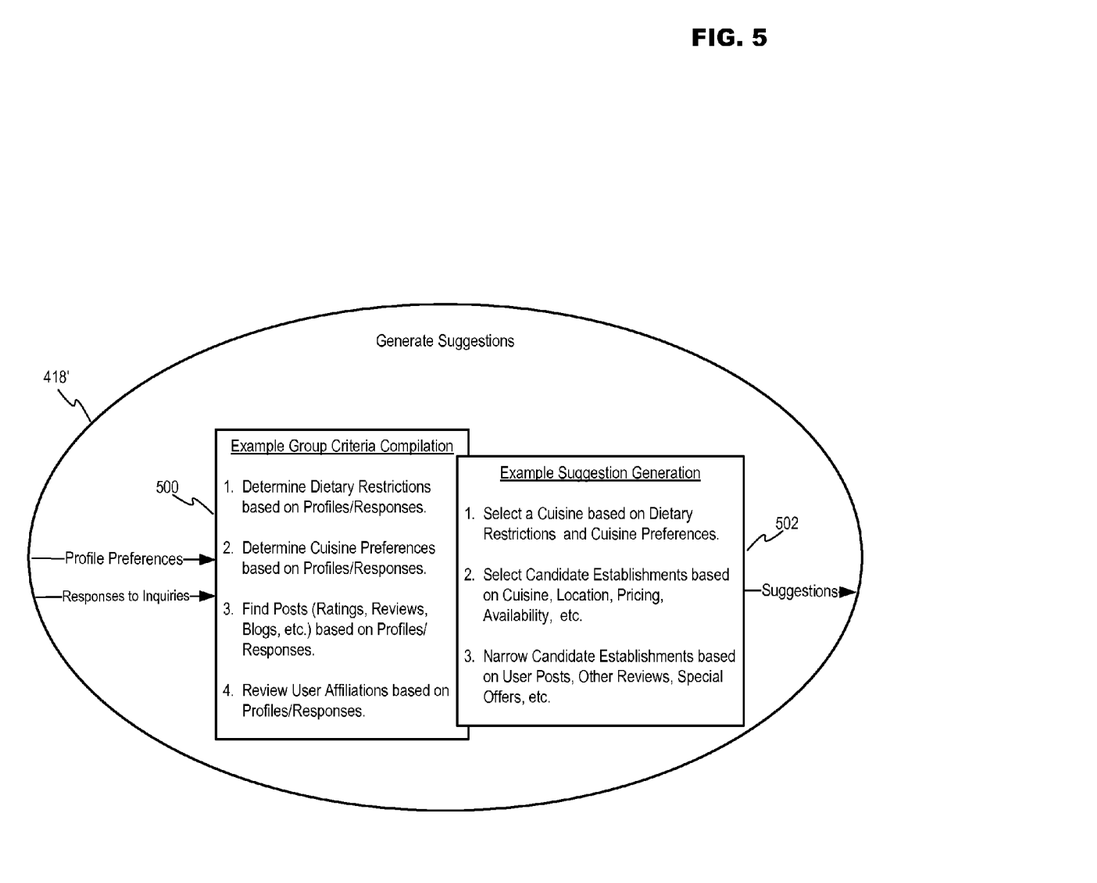
FIG. 5 illustrates an example of suggestion generation in accordance with at least one embodiment of the present disclosure.

FIG. 5 illustrates an example of suggestion generation in accordance with at least one embodiment of the present disclosure. The example suggestion generation in FIG. 5 pertains to the selection of a dining establishment, which has been presented herein merely for the sake of explanation. The various embodiments of the disclosed system are not limited to this function, and thus, may also be utilized for the selection of other activities based on group criteria such as movies, plays, live music, shopping, other amusements, etc. Initially generate choices 418' may receive inputs of user preferences determined from profiles (e.g., profile preferences) and user preferences determined from responses to inquiries. The user preferences may be utilized in group criteria compilation at 500. For example, when trying to select a dining establishment it may be advantageous to first establish dietary restrictions for the group. For example, group members may be vegetarian, vegan, allergic to certain foods, observe religious restrictions, etc. Next, cuisine preferences may be compiled (e.g., in view of the dietary restrictions). In one embodiment various cuisines may be placed in a preferential order based on the number of users in the group that prefer each cuisine. Group criteria compilation may further include compiling user posts related to dining (e.g., ratings, reviews, blogs, etc.). Finally, user affiliations may be compiled (e.g., discount programs, professional organizations, auto clubs, etc.). Group criteria compilation 500 may also include other information not identified at 500. The operations in FIG. 5 are merely provided for the sake of example herein, and is not intended to be exhaustive.

The group criteria compiled at 500 may then be utilized in selection generation at 502. In the instance of suggesting a dining establishment it may be advantageous to first select a cuisine based on the dietary restrictions and cuisine preferences of the users as determined during group criteria compilation 500. Once a preferred type of cuisine has been established for the group, candidate establishments that are deemed to serve the preferred type of cuisine may be selected. These establishments may be selected based upon various parameters such as, but not limited to, location (e.g., proximity to the current group location), pricing, availability (e.g., current ability to accept a group reservation), etc. The list of candidates may then be narrowed based on other group selection criteria such as user/other posts pertaining to the candidate establishments, special offers available at the candidate establishments (e.g., possibly due to a group member affiliation). For example, a group member may have posted a rating of an establishment the day before saying that they enjoyed their visit. While the positive rating would normally cause the candidate to be considered, the fact that a user had just visited the establishment may cause it to not be suggested. Moreover, one or more of the candidate establishments may offer specials at certain times of day, for groups larger than a certain amount, etc. If applicable to the group, the specials may cause an establishment to be suggested. Group members may also have "wish lists" including establishments that are not available in a group member's home area. Being on a wish list may cause an establishment to be suggested. The result of selection generation 502 may then be one or more suggestions based on the group criteria being submitted to the proxy device.

Figure 6:
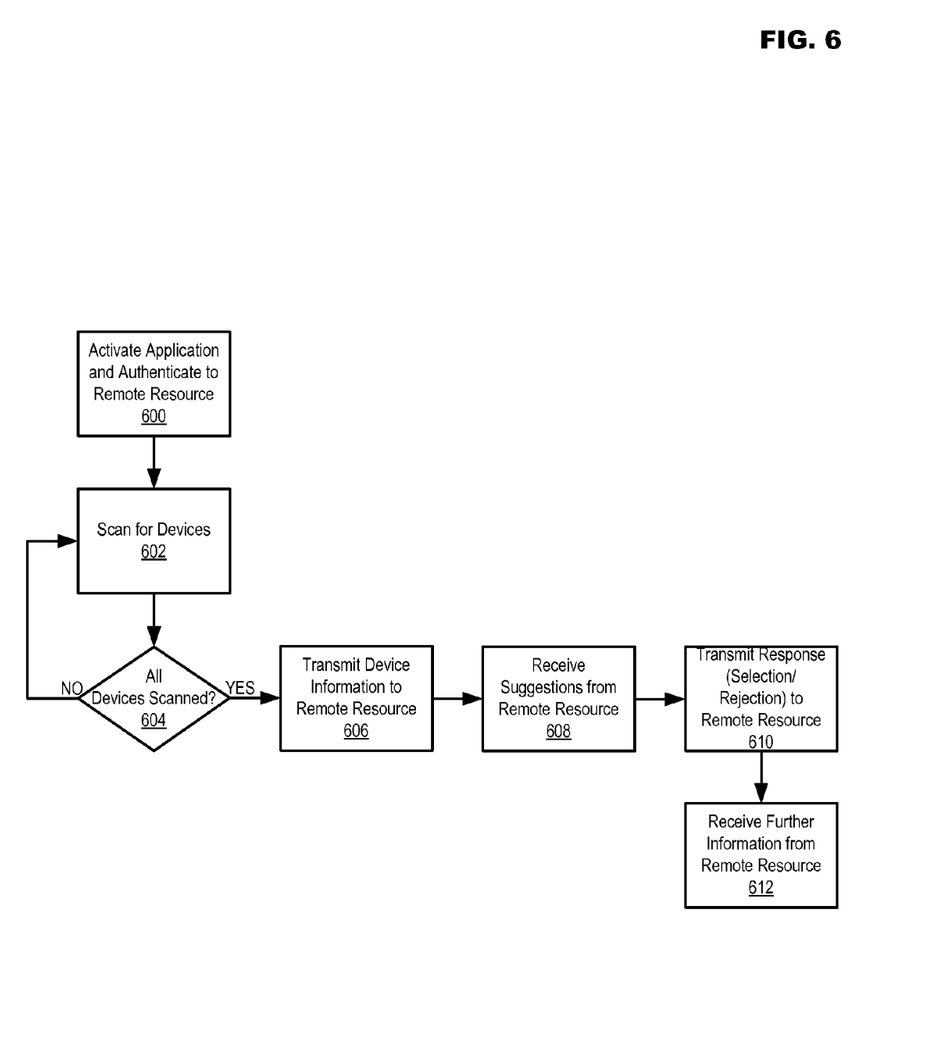
FIG. 6 is a flowchart of example operations, from the perspective of a proxy device, in accordance with at least one embodiment of the present disclosure.

FIG. 6 is a flowchart of example operations, from the perspective of a proxy device, in accordance with at least one embodiment of the present disclosure. In operation 600 a group selection application (e.g., corresponding to a group selection service) may be activated in the proxy device, the service then authenticating the proxy device. Authentication may include, for example, receiving identification information from the proxy device and verifying that the proxy device is registered with the service. After receiving confirmation of authentication the proxy device may proceed to scan for other devices in operation 602. Scanning for other devices may include transmitting a scanning signal and receiving device information that at least identifies the other devices that have been scanned. The proxy device may continue to scan for other devices until a determination is made in operation 604 that all of the other devices have been scanned. In operation 606 the proxy device may transmit at least the received device information that at least identifies the other devices that have been scanned to a remote resource. The proxy device may receive one or more suggestions from the remote resource in operation 608. The proxy device may then transmit a response to the one or more suggestions in operation 610 (e.g., after the group has considered the one or more suggestions). The response may either select one of the one or more suggestions or reject all of the suggestions. In one embodiment a rejection of all of the suggestions may also include further information that may be used by the remote resource in providing further suggestions (e.g., an alternate type of cuisine, a price limit, a desired location, etc.) In operation 612 the proxy device may receive further information from the remote resource. The further information may include a reservation (e.g., if one of the one or more suggestions was selected), further suggestions (e.g., if all of the suggestions were rejected). etc. In one embodiment the service may continue to provide suggestions for group activities as long as the application is active on the proxy device. For example, the service may track the group's position and suggest activities in that area, may make suggestions based on the time of day, etc.

Figure 7:
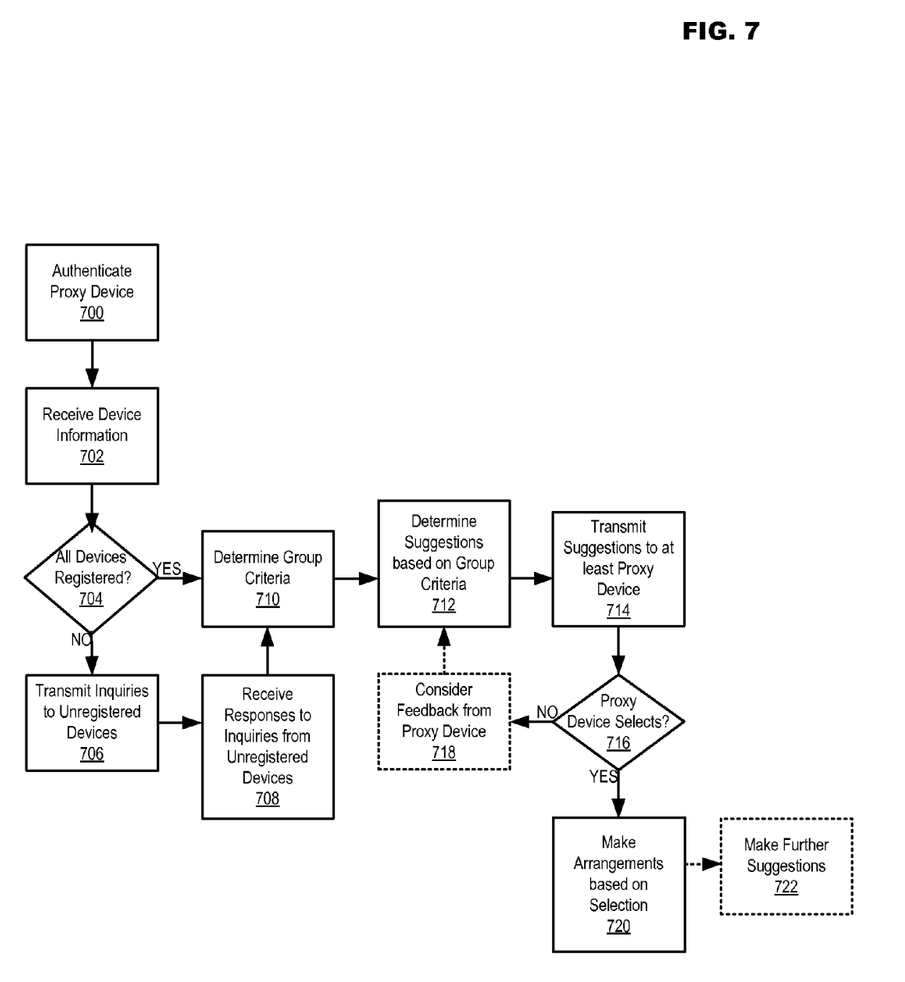
FIG. 7 is a flowchart of example operations, from the perspective of a remote resource, in accordance with at least one embodiment of the present disclosure.

FIG. 7 is a flowchart of example operations, from the perspective of a remote resource, in accordance with at least one embodiment of the present disclosure. In operation 700 the remote resource may receive a service activation request from a device acting as a proxy for a group, and may proceed to authenticate the device. Authentication may include the remote resource receiving identification information from the proxy device and verifying that the proxy device is registered with the service. The remote resource may then receive device information identifying other group devices from the proxy device in operation 702. A determination may then be made in operation 704 as to whether the other devices identified by the device information are registered with the service. If it is determined that some of the other devices are not registered, then in step 706 the remote resource may transmit inquires to the unregistered devices. For example, the inquiries may confirm that the users of the other devices are part of the proxy device's group, may request preference information from the users of the other devices, and possibly if the users of the other devices want to join the service. In operation 708 the remote resource may receive responses from the unregistered other devices.

Regardless of whether the other devices were determined to be registered in operation 704, or if they were determined to be unregistered and received inquiries/transmitted responses in operations 706-708, in operation 710 group criteria may be determined Group criteria may be based on preference information for the group members. For the other devices determined to be registered with the service, preference information may be obtained from profiles accessible to the service. For the other devices determined to be unregistered, preference information may be obtained from the responses received in operation 708. The group criteria may then be used to determine one or more suggestions in operation 712. In one embodiment information available from the Internet (e.g., ratings websites, discount sites, blogs, etc.) may be employed along with the group criteria in order to generate the one or more suggestions. The one or more suggestions may then be transmitted to at least the proxy device in operation 714. In one embodiment the one or more suggestions may also be transmitted to the other devices. In operation 716 the remote resource may determine whether at least one of the one or more suggestions was selected based on a response received from the proxy device. If in operation 716 it is determined that all of the one or more suggestions were rejected, then in optional step 718 the remote resource may consider feedback from the proxy device (e.g., provided with the rejection), the feedback being employed in operation 712 when additional suggestions may be generated. If in operation 716 it is determined that at least one suggestion was selected by the proxy device, then in operation 720 the remote resource may make arrangements (e.g., reservations) in accordance with the selection. In optional step 722 the remote resource may continue to make suggestions to the proxy device. for example, the remote resource may monitor the group (e.g., group location, time of day, etc.) and may continue to make suggestions to the group accordingly.

While FIGS. 6 and 7 illustrate various operations according to various embodiments, it is to be understood that not all of the operations depicted in FIGS. 6 and 7 are necessary for other embodiments. Indeed, it is fully contemplated herein that in other embodiments of the present disclosure, the operations depicted in FIGS. 6 and 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software modules executed by a programmable control device. The storage medium may be non-transitory.

Thus, the present disclosure provides systems and methods for generating suggestions based on group criteria. A device may act as a proxy for a group and scan information from other devices in the group. The proxy device may then transmit the scanned information to a remote resource. The remote resource may obtain preference information based on profile information, for devices that are determined to be registered with a service, and based on inquiry responses for unregistered devices. The preference information may be compiled into group criteria that may be employed in making one or more suggestions to the group. If the group selects one of the suggestions then the remote resource may make arrangements based on the selection. Otherwise, additional suggestions may be provide to the group. The remote resource may also monitor the group and continue to make suggestions accordingly.

According to one aspect there is provided a system. The system may include communication circuitry configured to transmit and receive information and one or more storage mediums. In addition, the one or more storage mediums having stored thereon, individually or in combination, instructions that when executed by one or more processors result in the following operations comprising establishing communication with a remote resource, scanning for devices via wireless communication, receiving device information in response to the scanning, the device information including at least device identification information for devices within scanning range, transmitting a message to the remote resource, the message including the device information, receiving a message from the remote resource, the message including one or more suggestions based on the device information and transmitting a message based on the one or more suggestions.

The above system may further be configured, wherein establishing communication with the remote resource comprises providing identity information and location information to the remote resource.

The above system may further be configured, wherein the message based on the one or more suggestions indicates that one of the one or more suggestions is selected or that all of the one or more suggestions are rejected. In this example configuration, the instructions that when executed by one or more processors may result in additional operations including receiving a second message from the remote resource in response to one of the one or more suggestions being selected, the message indicating that a reservation has been made based on the selected suggestion. In this example configuration, the instructions that when executed by one or more processors may also result in additional operations including receiving a second message from the remote resource in response to all of the one or more suggestions being rejected, the message including one or more additional suggestions.

According to another aspect there is provided a method. The method may include establishing communication with a remote resource, scanning for devices via wireless communication, receiving device information in response to the scanning, the device information including at least device identification information for devices within scanning range, transmitting a message to the remote resource, the message including the device information, receiving a message from the remote resource, the message including one or more suggestions based on the device information and transmitting a message based on the one or more suggestions.

The above method may be further configured, wherein establishing communication with the remote resource comprises providing identity information and location information to the remote resource.

The above method may be further configured, wherein the message based on the one or more suggestions indicates that one of the one or more suggestions is selected or that all of the one or more suggestions are rejected. For example, this method may further comprise receiving a second message from the remote resource in response to one of the one or more suggestions being selected, the message indicating that a reservation has been made based on the selected suggestion. For example, this method may also further comprise receiving a second message from the remote resource in response to all of the one or more suggestions being rejected, the message including one or more additional suggestions.

According to another aspect there is provided a method. The method may include receiving a message from a proxy device that is registered with a service, the message including device information identifying one or more other devices, determining group criteria based on the device information, determining one or more suggestions based on the group criteria and transmitting a message to the proxy device, the message including the one or more suggestions.

The above method may further comprise determining if any of the one or more other devices are registered with the service based on the device information, and determining preference information based on profiles accessible via the service for each of the other devices that are determined to be registered with the service. For example, the method may further comprise transmitting messages to each of the one or more other devices that are determined to not be registered with the service based on the device information, the messages requesting at least preference information, and receiving messages including at least preference information. For example, the method may further comprise determining group criteria based on the device information comprises determining group criteria based on the preference information.

The above method may be further configured, wherein determining one or more suggestions based on the group criteria comprises determining one or more suggestions based on the group criteria and at least one of availability information, review information and special offer information.

According to another aspect there is provided a communications device arranged to perform any of the above methods.

According to another aspect there is provided at least one server arranged to perform any of the above methods.

According to another aspect there is provided at least one machine readable medium comprising a plurality of instructions that, in response to be being executed on a computing device, cause the computing device to carry out any of the above methods.

According to another aspect there is provided an apparatus for receiving suggestions based on group criteria, configured to perform any of the above methods.

According to another aspect there is provided an apparatus for generating suggestions based on group criteria, configured to perform the method of any of the above methods.

According to another aspect there is provided a system. The system may include communication circuitry configured to transmit and receive information and one or more storage mediums. In addition, the one or more storage mediums having stored thereon, individually or in combination, instructions that when executed by one or more processors result in the following operations comprising receiving a message from a proxy device that is registered with a service, the message including device information identifying one or more other devices, determining group criteria based on the device information, determining one or more suggestions based on the group criteria and transmitting a message to the proxy device, the message including the one or more suggestions.

The above system may further be configured, wherein the instructions that when executed by one or more processors result in additional operations including determining if any of the one or more other devices are registered with the service based on the device information, and determining preference information based on profiles accessible via the service for each of the other devices that are determined to be registered with the service. In this example configuration, the instructions that when executed by one or more processors may result in additional operations including transmitting messages to each of the one or more other devices that are determined to not be registered with the service based on the device information, the messages requesting at least preference information, and receiving messages including at least preference information. In this example configuration the system may be configured, wherein determining group criteria based on the device information comprises determining group criteria based on the preference information.

The above system may further be configured, wherein determining one or more suggestions based on the group criteria comprises determining one or more suggestions based on the group criteria and at least one of availability information, review information and special offer information.

According to another aspect there is provided a system. The system may include one or more storage mediums having stored thereon, individually or in combination, instructions that when executed by one or more processors result in the following operations comprising establishing communication with a remote resource, scanning for devices via wireless communication, receiving device information in response to the scanning, the device information including at least device identification information for devices within scanning range, transmitting a message to the remote resource, the message including the device information, receiving a message from the remote resource, the message including one or more suggestions based on the device information and transmitting a message based on the one or more suggestions.

The above system may further be configured, wherein establishing communication with the remote resource comprises providing identity information and location information to the remote resource.

The above system may further be configured, wherein the message based on the one or more suggestions indicates that one of the one or more suggestions is selected or that all of the one or more suggestions are rejected. In this example configuration, the instructions that when executed by one or more processors may result in additional operations including receiving a second message from the remote resource in response to one of the one or more suggestions being selected, the message indicating that a reservation has been made based on the selected suggestion. In this example configuration, the instructions that when executed by one or more processors may also result in additional operations including receiving a second message from the remote resource in response to all of the one or more suggestions being rejected, the message including one or more additional suggestions.

According to another aspect there is provided a system. The system may include one or more storage mediums having stored thereon, individually or in combination, instructions that when executed by one or more processors result in the following operations comprising receiving a message from a proxy device that is registered with a service, the message including device information identifying one or more other devices, determining group criteria based on the device information, determining one or more suggestions based on the group criteria and transmitting a message to the proxy device, the message including the one or more suggestions.

The above system may further be configured, wherein the instructions that when executed by one or more processors result in additional operations including determining if any of the one or more other devices are registered with the service based on the device information, and determining preference information based on profiles accessible via the service for each of the other devices that are determined to be registered with the service. In this example configuration, the instructions that when executed by one or more processors may result in additional operations including transmitting messages to each of the one or more other devices that are determined to not be registered with the service based on the device information, the messages requesting at least preference information, and receiving messages including at least preference information. In this example configuration the system may be configured, wherein determining group criteria based on the device information comprises determining group criteria based on the preference information.

The above system may further be configured, wherein determining one or more suggestions based on the group criteria comprises determining one or more suggestions based on the group criteria and at least one of availability information, review information and special offer information.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
    communication circuitry configured to transmit and receive information; and
    one or more non-transitory storage mediums having stored thereon, individually or in combination, instructions that when executed by one or more processors result in the following operations comprising:
    receiving a first message from a proxy device that is registered with a service, the first message including device information identifying one or more other devices;
    determining group criteria based on the device information;
    determining one or more suggestions based on the group criteria; and
    transmitting a second message to the proxy device, the second message including the one or more suggestions;
    determining if any of the one or more other devices are registered with the service based on the device information;
    when it is determined that at least one of the other devices is an unregistered device that is not registered with the service, transmitting one or more preference request messages to the unregistered device, wherein the one or more preference request messages request preference information and are configured to cause the unregistered device to transmit one or more preference indication messages including said preference information.

2. The system of claim 1, wherein the instructions that when executed by one or more processors result in the following additional operations, comprising:
    for each of the other devices that are determined to be registered with the service, determining preference information based on profiles accessible via the service.

3. The system of claim 2, wherein the instructions that when executed by one or more processors result in the following additional operations comprising:
    receiving the one or more preference indication messages from the unregistered device.

4. The system of claim 1, wherein determining group criteria based on the device information comprises determining group criteria based on the preference information.

5. The system of claim 1, wherein determining one or more suggestions based on the group criteria comprises determining one or more suggestions based on the group criteria and at least one of availability information, review information and special offer information.

6. A system, comprising one or more non-transitory storage mediums having stored thereon, individually or in combination, instructions that when executed by one or more processors result in the following operations comprising:
    receiving a first message from a proxy device that is registered with a service, the first message including device information identifying one or more other devices;
    determining group criteria based on the device information;
    determining one or more suggestions based on the group criteria; and
    transmitting a second message to the proxy device, the second message including the one or more suggestions;
    determining if any of the one or more other devices are registered with the service based on the device information;

when it is determined that at least one of the other devices is an unregistered device that is not registered with the service, transmitting one or more preference request messages to the unregistered device, wherein the one or more preference request messages request preference information and are configured to cause the unregistered device to transmit one or more preference indication messages including said preference information.

7. The system of claim 6, wherein the instructions that when executed by one or more processors result in the following additional operations comprising:
for each of the other devices that are determined to be registered with the service, determining preference information based on profiles accessible via the service.

8. The system of claim 7, wherein the instructions that when executed by one or more processors result in the following additional operations comprising:
receiving the one or more preference indication messages from the unregistered device.

9. The system of claim 6, wherein determining group criteria based on the device information comprises determining group criteria based on the preference information.

10. The system of claim 6, wherein determining one or more suggestions based on the group criteria comprises determining one or more suggestions based on the group criteria and at least one of availability information, review information and special offer information.

11. A method, comprising:
receiving a first message from a proxy device that is registered with a service, the first message including device information identifying one or more other devices;
determining group criteria based on the device information;
determining one or more suggestions based on the group criteria; and
transmitting a second message to the proxy device, the second message including the one or more suggestions;
determining whether any of the one or more other devices are registered with the service based on the device information;
when it is determined that at least one of the other devices is an unregistered device that is not registered with the service, transmitting one or more preference request messages to the unregistered device, wherein the one or more preference request messages request preference information and are configured to cause the unregistered device to transmit one or more preference indication messages including said preference information.

12. The method of claim 11, further comprising:
determining preference information based on profiles accessible via the service for each of the other devices that are determined to be registered with the service.

13. The method of claim 12, wherein the method further comprises:
Receiving the one or more preference indication messages from the unregistered device.

14. The method of claim 11, wherein determining group criteria based on the device information comprises determining group criteria based on the preference information.

15. The method of claim 11, wherein determining one or more suggestions based on the group criteria comprises determining one or more suggestions based on the group criteria and at least one of availability information, review information and special offer information.

* * * * *